Nov. 19, 1957  L. F. VALENTINE  2,813,399
HYDRAULIC FLUID PRESSURE BOOSTER
Filed June 4, 1956

Lawrence F. Valentine,
INVENTOR.

BY
William C. Babcock
ATTORNEY.

United States Patent Office 2,813,399
Patented Nov. 19, 1957

2,813,399

HYDRAULIC FLUID PRESSURE BOOSTER

Lawrence F. Valentine, Long Beach, Calif., assignor, by mesne assignments, to James H. Townsend, Anaheim, Calif.

Application June 4, 1956, Serial No. 589,155

8 Claims. (Cl. 60—54.5)

The present invention relates generally to the field of hydraulic appliances, and more particularly to a booster for increasing the pressure exerted by hydraulic fluid in actuating brakes or the like.

The primary purpose in devising the present invention is to supply a hydraulic booster of such design that it may be removably attached to an automotive master cylinder and connected to the fluid-carrying conduits extending to the brakes, without the necessity of altering the cylinder or the connections in order to install the invention therebetween.

The major object of the invention is to supply a hydraulic booster of simplified mechanical construction that is of compact design, can be fabricated from standard, commercially available materials, and retailed at a sufficiently low price as to encourage its widespread use.

Another object of the invention is to supply a device of the character described in which the pressure exerted by the hydraulic fluid may be increased the desired amount without the use of cumbersome, expensive auxiliary equipment.

A still further object of the invention is to supply a hydraulic booster that has a minimum of moving parts, is subject to a minimum of wear, is substantially trouble-free when in use, and requires very little maintenance attention.

These and other objects and advantages of the invention will become apparent from the following description of a preferred form thereof, when taken in conjunction with the accompanying drawing illustrating that form, in which.

Figure 1:
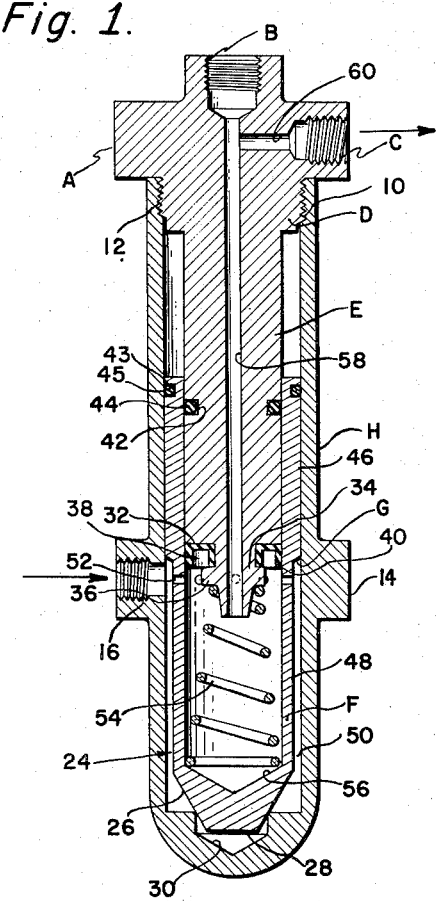
Figure 1 is a vertical cross-sectional view of the invention prior to actuation thereof to increase the pressure on hydraulic fluid in the brake system.

Referring now to the drawings for the general arrangement of the invention, it will be seen to include a body A in which a tapped air bleeder valve connection B is formed, as well as a port C through which hydraulic fluid may travel to the air brakes or other fluid-actuated mechanism to be actuated thereby. A stud D depends downwardly from body A, which stud supports a rigid elongate cylindrical member E. An elongate cup-shaped sleeve F is slidably mounted on member E, and this sleeve has a circumferentially extending body shoulder G defined on the exterior surface thereof, for reasons that will hereinafter be explained in detail.

Figure 2:
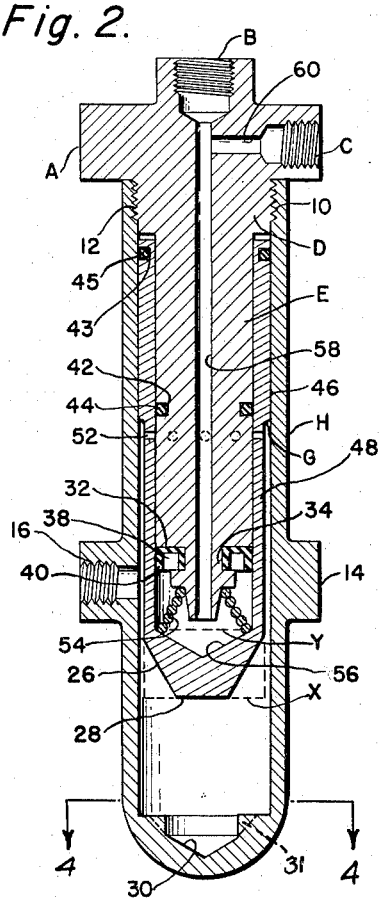
Figure 2 is a vertical cross-sectional view of the device showing the interior components thereof in actuation; and, Figure 3 is a front elevational view of the device shown connected to the master cylinder and fluid-delivering conduits of an automotive brake system.
Figure 3:
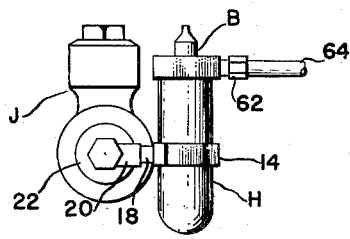

The elongate member E and sleeve F are completely enclosed within the confines of a cup-shaped housing H that is preferably provided with threads 10 on the upper end thereof, which engage threads 12 formed on stud D to removably connect housing H and body A. Housing H preferably is provided with a nut 14 formed as an integral part thereof (Figure 1), to facilitate the removal of the housing from the body when necessary for maintenance purposes, or for inspection of the interior of the invention. A tapped bore 16 extends through nut 14, which bore is adapted to be connected to a suitable tubular fitting 18 that in turn, by means of a conduit 20 or other fluid-carrying fitting is connected to the fluid-discharge 22 of a master cylinder J, as shown in Figure 3. The lower portion 24 of sleeve F, as can best be seen in Figures 1 and 2, is defined by a downwardly and inwardly tapering side wall 26, the lower edge of which terminates in a flat face 28. The lower interior portion of housing H has a cavity 30 formed therein in which a part of sleeve portion 24 is disposed when the invention is not actuated (Figure 1).

When the invention is not actuated (Figure 1) body shoulder G on the exterior surface of sleeve F is positioned above tapped bore 16.

Member E is provided with a flat, ring-shaped surface 32 on the lower portion thereof, from the center portion of which a tubular member 34 extends downwardly. An intermediately disposed collar 36 is formed on the exterior surface of tube 34. Collar 36, the upper exterior portion of member 34, and the ring-shaped surface 32, in combination with the interior surface of housing H, cooperatively define a confined space 38 in which a resilient ring-shaped, fluid-sealing member 40 is removably disposed. A circumferentially extending slot 42 is formed in the exterior surface of elongate member E at a position intermediate the surface 32 and the lower surface of stud D.

Slot 42 supports a resilient O-ring 44 which at all times slidably engages the interior surface of sleeve F. As may be seen in Figure 1, the external diameter of an upper portion 46 of sleeve F is such as to permit slidable engagement thereof with the interior surface of housing H, with the upper portion 46 terminating at its lower edge in the body shoulder G. Sleeve F also includes a lower portion 48 that extends downwardly from shoulder G and is of slightly smaller external diameter than portion 46, and to the extent that an annulus-shaped space 50 is defined between the lower portion 48 and the interior surface of housing H. A number of small circumferentially spaced bores 52 are formed in sleeve F which are so disposed that when the sleeve is in the position shown in Figure 1, the bores are in communication with bore 16, and are in fluid communication with the interior of sleeve F. The lower interior surface of housing H is shaped so as to provide fluid passageways whereby when the sleeve is in the position shown in Figure 1, fluid may pass from space 50 into cavity 30.

Figure 4:
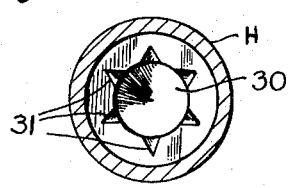
Figure 4 is a horizontal cross-sectional view along line 4—4 of Figure 2 showing a detail of its interior construction.

Figure 4 is a cross-sectional view of the lower interior of housing H, showing a plurality of grooves 31 which surround cavity 30, providing passageways whereby when the sleeve is in the downward position shown in Figure 1, fluid may pass from space 50 into cavity 30.

A tapered helical spring 54 is provided, the lower portion of which rests on the bottom 56 of sleeve F, with the upper end portion of the spring abutting against the under surface of collar 36. Spring 54 is under compression, and tends at all times to return sleeve F to the position shown in Figure 1 where the lower sleeve portion is partially disposed within the cavity 30.

A longitudinally extending bore 58 is formed in member E and body A, which bore communicates with the bleeder valve connection B. A transversely disposed bore 60 is formed in body A that is in communication with bore 58 and port C, as may best be seen in Figures 1 and 2.

Structurally, the tapering side wall 26 and flat face 28 are of considerably larger cross-sectional area than the transverse cross-sectional area of the interior of sleeve F. The ratio of the combined surface areas of the body shoulder G, face 28 and the horizontal projection of the tapering side wall 26 to the horizontal projection of the lower portion 56 of sleeve F defines the increase in hydraulic pressure that will be obtained over the pressure of fluid when it enters bore 16 and is discharged from port C. The horizontal projection of side wall 26 is shown in phantom line and generally identified by the letter X. The horizontal projection of portion 56 is likewise shown in phantom line in the same figure and identified by the letter Y.

In use the operation of the invention is extremely simple. The device is connected to the master cylinder J, as previously explained in detail and shown in Figure 3, with the port C being connected by a suitable tubular fitting 62 to a conduit 64 that extends to the brake mechanism, or other hydraulically operated device to be actuated. When thus connected, the interior components of the invention are arranged as shown in Figure 1. Hydraulic fluid is permitted to flow from the master cylinder J into the invention through bore 16 to flood the lower interior portion of housing H, as well as the interior of sleeve F, due to the fluid flowing therein through bores 52. When the master cylinder is actuated by downward pressure on the brake pedal (not shown), or other suitable mechanism, sufficient pressure is applied to the fluid within the confines of the invention that the pressure of fluid on the body shoulder G overcomes the compression of spring 54 and the sleeve F rises to the extent that bores 52 are initially sealed by the sealing member 40 and subsequently, by contact with the exterior surface of the elongate member E.

Fluid within the confines of sleeve F is then separated from fluid on the exterior thereof, with the pressure of the fluid on the exterior surface being exerted on the body shoulder G and surface 28, as well as the tapered side wall 26. This combined pressure is thereafter exerted on the smaller area of the lower portion 56 of sleeve F, and as a result the pressure on the fluid within the sleeve as well as that in bores 58 and 60, is increased by the ratio previously mentioned. Thus, if fluid is discharged into the invention through bore 16 at a pressure of 60 p. s. i., and the area of body shoulder G, flat face 28, and the horizontal projection of the tapered side wall 26 is two square inches, and the horizontal projection of portion 56 is one square inch, as sleeve F rises to the position shown in Figure 2, it will cause fluid to be discharged from port C at a pressure of 120 lbs. p. s. i.

An air bleeder valve connection 66 of conventional design is preferably disposed in port B. When pressure on the actuating fluid entering bore 16 is released, the compressed spring 54 coupled with the fluid at higher pressure within the confines of sleeve F will cause the sleeve to move downwardly from the position shown in Figure 2 to the initial sleeve position shown in Figure 1. When the sleeve has been so returned to its initial position, the invention is again ready to be used in boosting the pressure of hydraulic fluid entering the bore 16 to a higher pressure when it is discharged from port C.

Although the invention herein shown and described is fully capable of achieving the objects and providing the advantages as herein set forth, it is to be understood that it is merely illustrative of the presently preferred embodiments thereof and that I do not mean to limit myself to the details as herein described and shown other than as defined in the appended claims.

I claim:

1. A device for use in intensifying the pressure on hydraulic fluid between a source of same and the position where said fluid is to be used for actuating purposes, including: a body having a liquid discharge port formed therein; an elongate member of circular transverse cross section that depends from said body, which member and body are provided with a fluid passage which is in communication with said discharge port; a housing that envelopes said member and is spaced therefrom, said housing having a liquid inlet port formed therein; means that hold said housing and body in fluid-tight engagement; an elongate cup-shaped sleeve disposed in said housing, the interior surface of which sleeve slidably engages said member, with a portion of the exterior surface of said sleeve slidably engaging the interior surface of said housing, which sleeve has a circumferentially extending body shoulder formed on the exterior thereof, said sleeve having a plurality of bores formed therein through which fluid can flow to the interior thereof, which bores are so disposed as to be slightly under the exterior surface portion of said member when said sleeve rests on the lower interior portion of said housing, and which sleeve has a lower interior bottom that is smaller in surface area than the combined surfaces of said body shoulder and exterior sleeve bottom; and spring means that at all times tends to maintain said sleeve in contact with said lower interior portion of said housing but with said body shoulder having sufficient area that said sleeve is lifted upwardly to further deform said spring means when fluid entering said inlet port is above a predetermined pressure, which upward movement seals said bores against said member and subjects said fluid within the confines of said sleeve and fluid passage to increased pressure.

2. A device as defined in claim 1 in which said means for holding said housing and body together is a tapped upper portion of said housing that threadedly engages threads formed on a boss extending from said body.

3. A device as defined in claim 2 in which said member has a circumferentially extending slot formed therein in which a resilient O-ring is disposed that is at all times in fluid-sealing engagement with the interior surface of said sleeve.

4. A device as defined in claim 3 in which said member is provided with a downwardly extending tubular member that supports an intermediately disposed collar, on which member a ring-shaped resilient fluid-sealing member is disposed in an encircling position above said collar, which sealing member is at all times in fluid-sealing contact with the interior surface of said sleeve.

5. A device as defined in claim 3 in which said ring-shaped member has an inverted U-shaped vertical cross section.

6. A device as defined in claim 4 in which said spring means is disposed within said sleeve and below said elongate member.

7. A device as defined in claim 6 in which said spring means is a compressed helical spring.

8. A device as defined in claim 7 in which said helical spring has the upper end thereof abutting against said collar and the lower end thereof resting on the lower interior surface of said sleeve.

No references cited.